US012303742B2

(12) United States Patent
Wang et al.

(10) Patent No.: US 12,303,742 B2
(45) Date of Patent: May 20, 2025

(54) METHOD AND DEVICE FOR PREDICTING SPORTS PERFORMANCE, AND COMPUTER READABLE STORAGE MEDIUM

(71) Applicant: GoMore Inc., New Taipei (TW)

(72) Inventors: En-Tzu Wang, New Taipei (TW); Szu-Hong Chen, New Taipei (TW)

(73) Assignee: GoMore Inc., New Taipei (TW)

( * ) Notice: Subject to any disclaimer, the term of this patent is extended or adjusted under 35 U.S.C. 154(b) by 293 days.

(21) Appl. No.: 17/853,938

(22) Filed: Jun. 30, 2022

(65) Prior Publication Data

US 2024/0001195 A1 Jan. 4, 2024

(51) Int. Cl.
*A63B 24/00* (2006.01)

(52) U.S. Cl.
CPC ...... *A63B 24/0062* (2013.01); *A63B 2220/20* (2013.01); *A63B 2220/40* (2013.01); *A63B 2220/803* (2013.01); *A63B 2220/836* (2013.01)

(58) Field of Classification Search
CPC ............ A63B 24/0062; A63B 2220/20; A63B 2220/40; A63B 2220/803; A63B 2220/836
See application file for complete search history.

(56) References Cited

U.S. PATENT DOCUMENTS

| | | | | |
|---|---|---|---|---|
| 5,897,457 A | * | 4/1999 | Mackovjak | A63B 24/00 482/3 |
| 2002/0059044 A1 | * | 5/2002 | Flentov | G01P 15/0891 702/176 |
| 2003/0093248 A1 | * | 5/2003 | Vock | A42B 3/0433 702/188 |
| 2006/0262120 A1 | * | 11/2006 | Rosenberg | G06F 3/011 345/473 |
| 2007/0015611 A1 | * | 1/2007 | Noble | A61B 5/1126 473/450 |
| 2011/0202152 A1 | * | 8/2011 | Barton | F42B 12/385 700/91 |
| 2012/0116853 A1 | * | 5/2012 | Safar | G06Q 30/02 705/7.42 |
| 2012/0236030 A1 | * | 9/2012 | Border | G06F 3/013 345/633 |
| 2013/0053190 A1 | * | 2/2013 | Mettler | A63B 24/0062 473/422 |

(Continued)

FOREIGN PATENT DOCUMENTS

| | | |
|---|---|---|
| CN | 110477924 | 11/2019 |
| JP | 2020004331 | 1/2020 |

(Continued)

OTHER PUBLICATIONS

"Office Action of Taiwan Counterpart Application", issued on Feb. 7, 2023, p. 1-p. 9.

*Primary Examiner* — Malina D. Blaise
(74) *Attorney, Agent, or Firm* — JCIPRNET

(57) ABSTRACT

A method and a device for predicting sports performance, and a computer readable storage medium are provided. The method includes: collecting motion data of a user in a process of the user performing a specific action through a wearable device; and in response to determining that the motion data conforms to action characteristics of the specific action, predicting at least one sports performance of the user performing at least one other action based on the motion data.

12 Claims, 6 Drawing Sheets

(56) References Cited

U.S. PATENT DOCUMENTS

| | | | | |
|---|---|---|---|---|
| 2013/0266918 | A1* | 10/2013 | Tinjust | A63B 24/0087 |
| | | | | 700/91 |
| 2013/0274040 | A1* | 10/2013 | Coza | G09B 19/0038 |
| | | | | 473/570 |
| 2015/0057966 | A1* | 2/2015 | Winter | A61B 5/1122 |
| | | | | 702/141 |
| 2015/0317910 | A1* | 11/2015 | Daniels | G09B 9/00 |
| | | | | 434/257 |
| 2017/0095181 | A1* | 4/2017 | Hauenstein | G01C 22/006 |
| 2017/0284805 | A1* | 10/2017 | Zihajehzadeh | G06V 40/23 |
| 2018/0279919 | A1* | 10/2018 | Bansbach | A61B 5/1118 |
| 2020/0147451 | A1* | 5/2020 | Frank | A61B 5/112 |
| 2022/0362654 | A1* | 11/2022 | Xu | A63B 71/0619 |
| 2023/0158388 | A1* | 5/2023 | Nedeau | A63F 13/812 |
| | | | | 473/450 |
| 2023/0293941 | A1* | 9/2023 | Ortega Avila | G06F 1/163 |
| | | | | 700/91 |
| 2024/0115193 | A1* | 4/2024 | Chih | A61B 5/7264 |

FOREIGN PATENT DOCUMENTS

| | | |
|---|---|---|
| TW | 202008962 | 3/2020 |
| TW | 202220728 | 6/2022 |

* cited by examiner

METHOD AND DEVICE FOR PREDICTING SPORTS PERFORMANCE, AND COMPUTER READABLE STORAGE MEDIUM

BACKGROUND

Technical Field

The disclosure relates to a sports detecting technique, and particularly relates to a method and device for predicting sports performance and a computer readable storage medium.

Description of Related Art

In modern society, techniques of performing sports detection to users through special equipment are quite common. For example, in the prior art, a technical means that a user wears certain measuring devices to obtain relevant motion data of the user through a motion detection device (for example, an inertial measuring unit) in the measuring device has been proposed.

However, in some situations, limited by venue or other factors, users may not be able to actually or frequently perform certain sports or easily measure sports performance by themselves (for example, 50-meter dash, long jump). Therefore, if it is able to design a technical solution that may predict a sports performance of the user performing other sports based on motion data of the user performing the certain sports, it helps to improve the convenience of motion detection, and it is able to adjust training intensity and method based on the sports performance at any time.

SUMMARY

The disclosure is directed to a method and device for predicting sports performance and a computer readable storage medium, which are adapted to resolve the aforementioned technical problems.

An embodiment of the disclosure provides a method for predicting sports performance, which is adapted to a sports performance predicting device, and includes: collecting motion data of a user in a process of the user performing a specific action through a wearable device; and in response to determining that the motion data conforms to action characteristics of the specific action, predicting at least one sports performance of the user performing at least one other action based on the motion data.

An embodiment of the disclosure provides a sports performance predicting device, which includes a storage circuit and a processor. The storage circuit stores a program code. The processor is coupled to the storage circuit, and accesses the program code to: collect motion data of a user in a process of performing a specific action through a wearable device; and in response to determining that the motion data conforms to action characteristics of the specific action, predict at least one sports performance of the user performing at least one other action based on the motion data.

An embodiment of the disclosure provides a computer readable storage medium, the computer readable storage medium records an executable computer program, and the executable computer program is loaded to a sports performance predicting device to perform following steps: collecting motion data of a user in a process of performing a specific action through a wearable device; and in response to determining that the motion data conforms to action characteristics of the specific action, predicting at least one sports performance of the user performing at least one other action based on the motion data.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
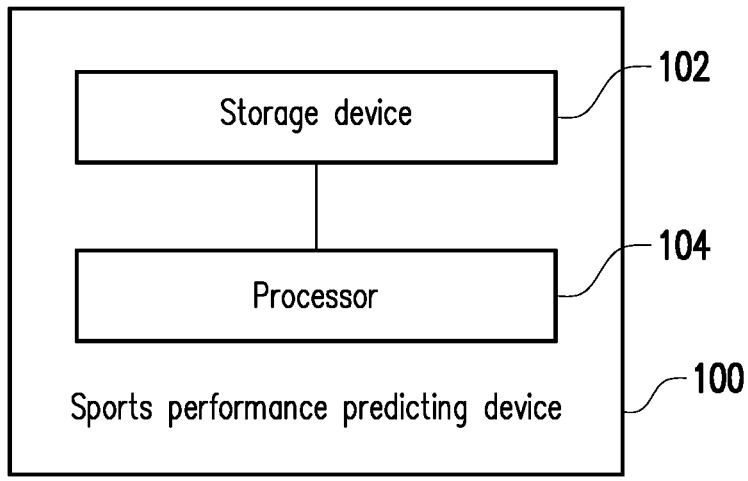
FIG. 1 is a schematic diagram of a sports performance predicting device according to an embodiment of the disclosure.

Referring to FIG. 1, FIG. 1 is a schematic diagram of a sports performance predicting device according to an embodiment of the disclosure. In different embodiments, a sports performance predicting device 100 may be, for example, implemented as being connected to various smart devices and/or computer devices of a wearable device (such as a smart bracelet, a smart watch, a smart ring, a sensor located on a wrist, palm or finger, or other similar wearable devices). In some embodiments, the sports performance predicting device 100 may also be integrated with the aforementioned wearable device into a same device, but the disclosure is not limited thereto.

In FIG. 1, the sports performance predicting device 100 includes a storage circuit 102 and a processor 104. The storage circuit 102 is, for example, any type of a fixed or movable random access memory (RAM), a read-only memory (ROM), a flash memory, a hard disc or other similar devices or a combination of these devices, and may be used to record a plurality of program code or modules.

The processor 104 is coupled to the storage circuit 102 and may be a general purpose processor, a special purpose processor, a conventional processor, a digital signal processor, a plurality of microprocessors, one or a plurality of microprocessors, controllers, microcontrollers, application specific integrated circuits (ASIC), field programmable gate arrays (FPGA) combined with digital signal processor kernels, any other kind of integrated circuit, state machine, advanced RISC machine (ARM)-based processors, and similar products.

In the embodiment of the disclosure, the processor 104 may access the modules and program codes recorded in the storage circuit 102 to implement a method for predicting sports performance proposed by the disclosure, and details thereof are described below.

Figure 2:
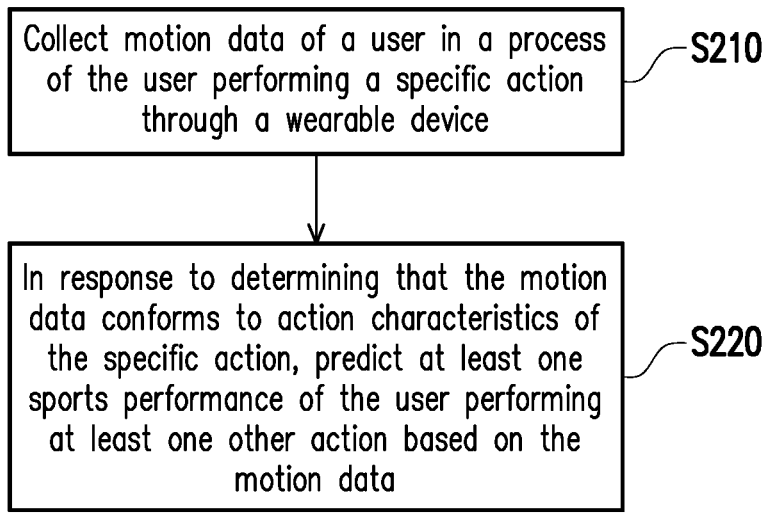
FIG. 2 is a flowchart of a method for predicting sports performance according to an embodiment of the disclosure.

Referring to FIG. 2, FIG. 2 is a flowchart of a method for predicting sports performance according to an embodiment of the disclosure. The method of the embodiment may be executed by the sports performance predicting device 100 in FIG. 1, and details of each step in FIG. 2 will be described below with reference of the components shown in FIG. 1.

In step S210, the processor 104 collects motion data of a user in a process of the user performing a specific action through a wearable device. In different embodiments, the aforementioned wearable device may be worn on different parts of the user's body according to the considered specific action. Furthermore, the wearable device may be provided with a motion detection device (for example, an inertial measuring unit), and motion data measured by the motion detection device may be used as the above motion data, but the disclosure is not limited thereto.

For ease of illustration, in embodiments of the disclosure, it is assumed that the considered specific action is a counter movement jump (CMJ) action. In this case, the aforementioned wearable device (such as a watch, a wristband or a ring) may be correspondingly worn on the user's hand, but the disclosure is not limited thereto. In the embodiment of the disclosure, in order to make the motion data measured from the user more accurate, the user may be requested to perform the CMJ action according to a specific principle.

Figure 3:
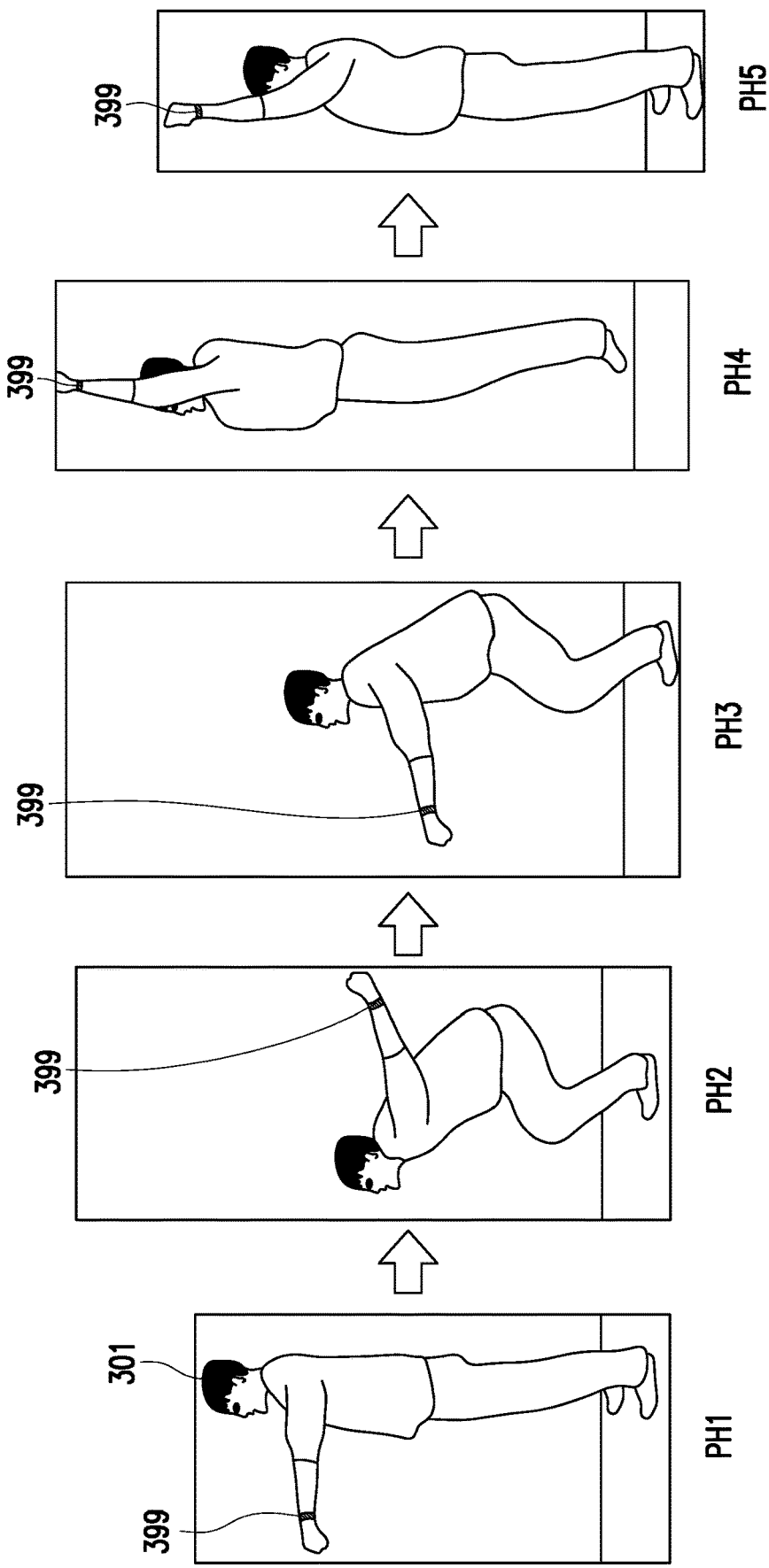
FIG. 3 is a schematic diagram of a CMJ action performed by a user according to an embodiment of the disclosure.

Referring to FIG. 3, FIG. 3 is a schematic diagram of a CMJ action performed by a user according to an embodiment of the disclosure. In FIG. 3, a user 301 may wear a wearable device 399 on his hand (for example, on the wrist), and sequentially perform five action phases PH1 to PH5 shown in FIG. 3 to complete one CMJ action.

In the action phase PH1 (which may be understood as a stationary phase), the user 301 needs to raise his hand forward and remain stationary for several seconds, for example, at least 2 seconds. In the action phase PH2 (which may be understood as a hand down-swinging phase), the user 301 needs to swing his hand downward/backward, and simultaneously squat down to prepare for take-off. In the action phase PH3 (which may be understood as a hand up-swinging phase), the user 301 needs to swing his hand upward/forward to generate a momentum to move his body up. In the action phase PH4 (which may be understood as a hang time phase), the user 301 may take off and stay in the air in response to the upward momentum generated in the action phase PH3. In the action phase PH5 (which may be understood as a landing phase), the user 301 may land on the ground and maintain a raised hand posture for several seconds, such as at least 2 seconds.

In other embodiments, in response to different considered specific actions, the user 301 may perform corresponding other action phases accordingly, which is not limited to the pattern shown in FIG. 3.

In an embodiment of the disclosure, the wearable device 399 may measure corresponding motion data in response to the action phases PH1-PH5 shown in FIG. 3, such as acceleration data, velocity data, and displacement data during the process that the user 301 performs the CMJ action, but the disclosure is not limited thereto.

Figure 4A:
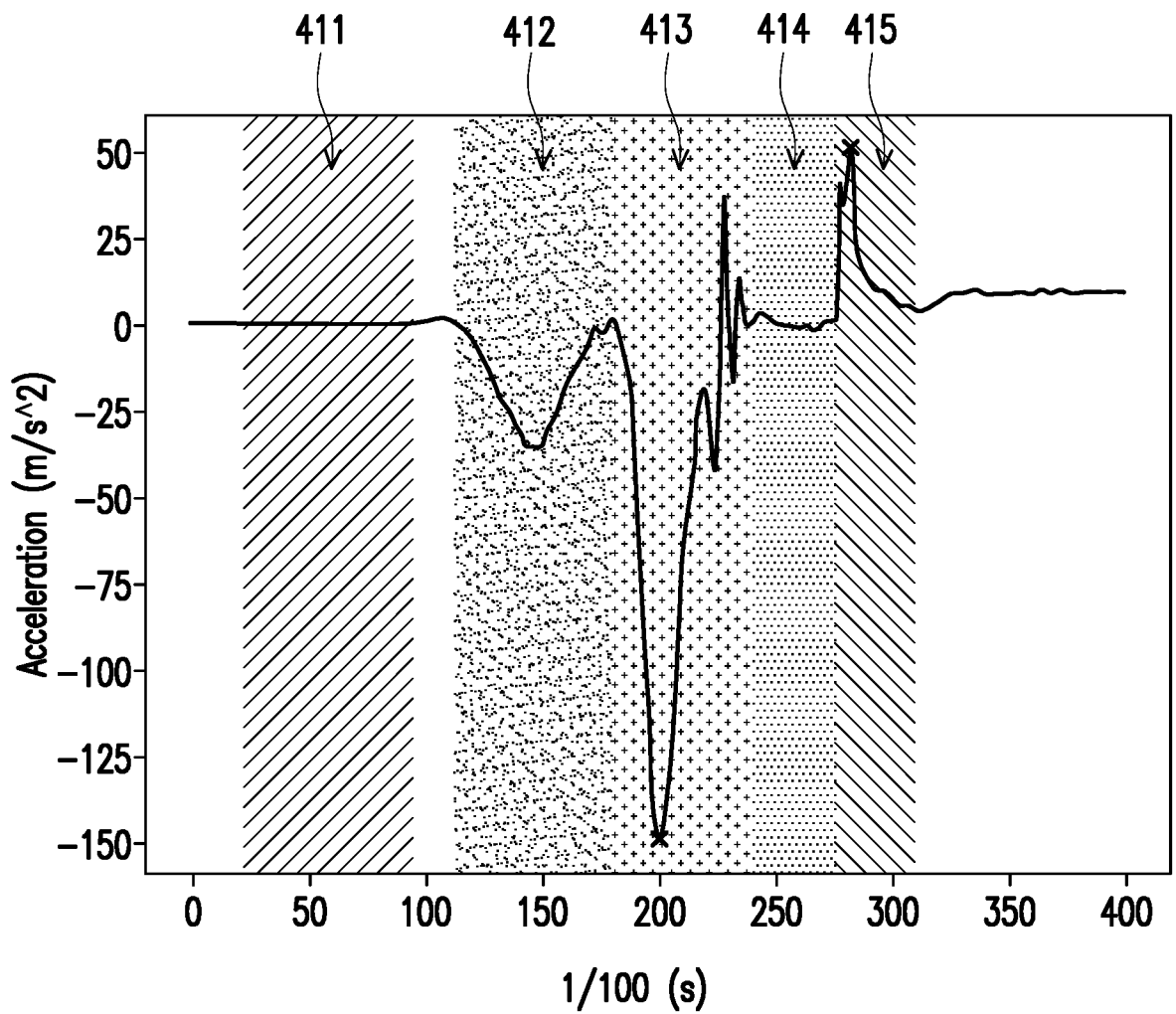
FIG. 4A is, for example, exemplary acceleration data measured during a process that the user performs the CMJ action.
Figure 4B:
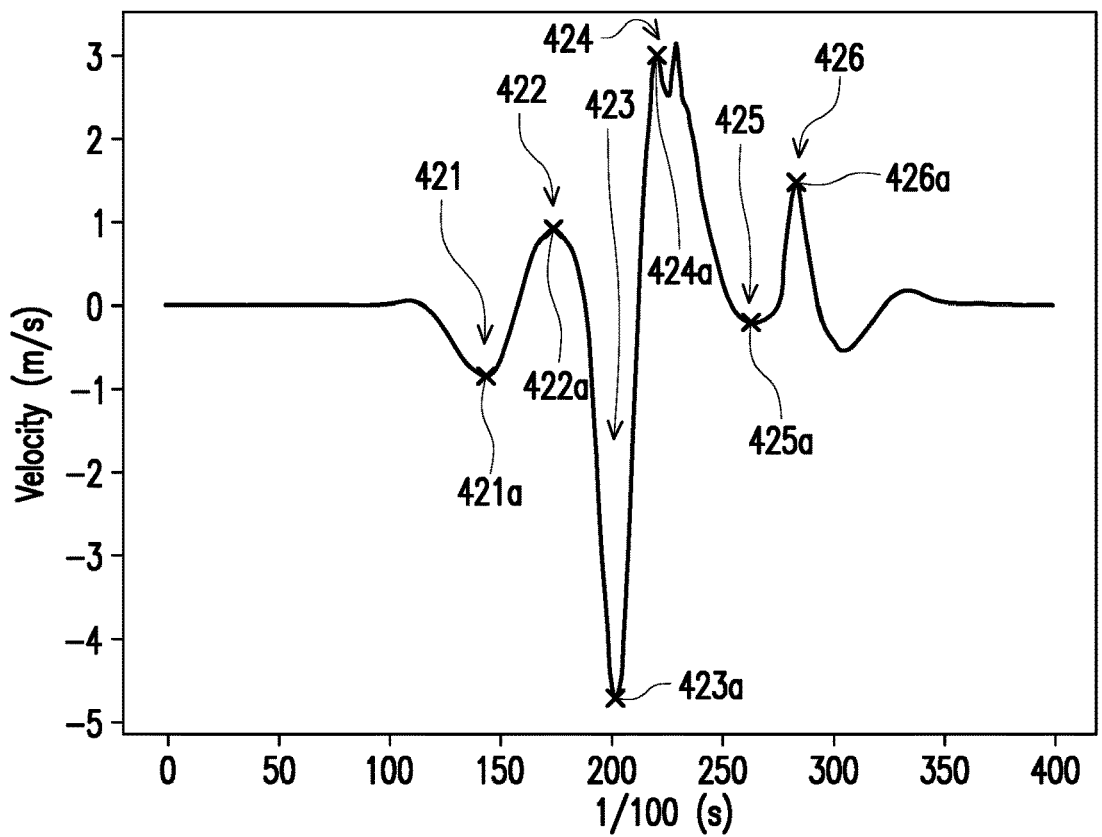
FIG. 4B is, for example, exemplary velocity data measured during the process that the user performs the CMJ action.
Figure 4C:
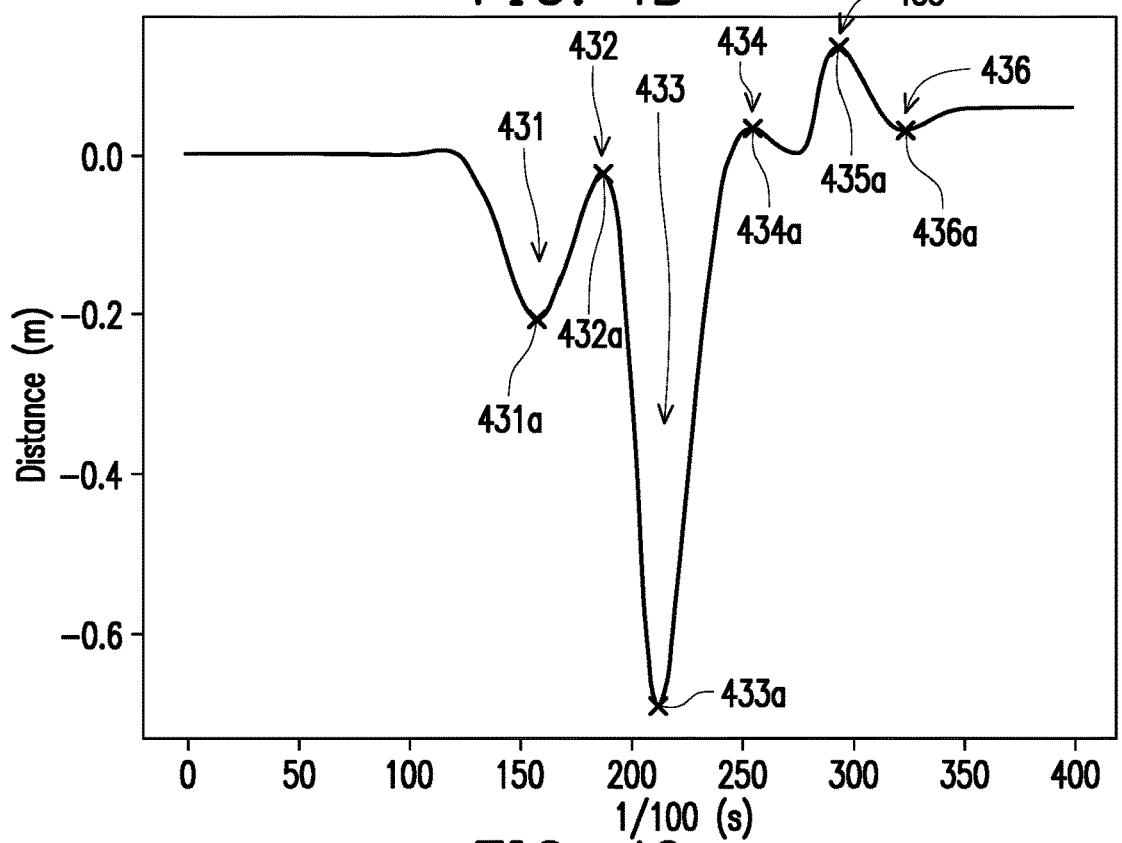
FIG. 4C is, for example, exemplary displacement data measured during the process that the user performs the CMJ action.

Refer to FIG. 4A to FIG. 4C, where FIG. 4A is, for example, exemplary acceleration data measured during the process that the user performs the CMJ action, FIG. 4B is, for example, exemplary velocity data measured during the process that the user performs the CMJ action, and FIG. 4C is, for example, exemplary displacement data measured during the process that the user performs the CMJ action.

In the embodiment of the disclosure, after obtaining the acceleration data in FIG. 4A, the processor 104 may, for example, perform integration (and a corresponding filtering operation) on the acceleration data in FIG. 4A to obtain the velocity data in FIG. 4B. In addition, the processor 104 may also perform integration on the velocity data in FIG. 4B to obtain the displacement data in FIG. 4C, but the disclosure is not limited thereto.

In the embodiment of the disclosure, after obtaining the data illustrated in FIG. 4A, FIG. 4B and FIG. 4C, the processor 104 may determine whether the motion data conforms to action characteristics of the CMJ action.

In an embodiment of the disclosure, the processor 104 may determine whether the acceleration data includes a specific acceleration variation interval, whether the velocity data includes a specific velocity variation interval, and/or whether the displacement data includes a specific displacement variation interval, so as to determine whether the motion data conforms to the action characteristics of the CMJ action.

In an embodiment of the disclosure, the considered specific acceleration variation interval may, for example, sequentially include a first acceleration variation interval, a second acceleration variation interval, a third acceleration variation interval, a fourth acceleration variation interval, and a fifth acceleration variation interval. In an embodiment, an average value and a standard deviation of the acceleration data in the first acceleration variation interval are smaller than a corresponding average threshold (for example, 0.5 g, where g is the acceleration of gravity) and a standard deviation threshold (for example, 0.1 g). The acceleration data in the second acceleration variation interval includes at least first acceleration data that is lower than a first acceleration threshold (for example, −25 m/s$^2$). The acceleration data in the third acceleration variation interval includes at least second acceleration data lower than a second acceleration threshold (for example, −125 m/s$^2$). The acceleration data in the fifth acceleration variation interval includes at least third acceleration data higher than a third acceleration threshold (for example, 25 m/s$^2$).

In the embodiment of the disclosure, the aforementioned first, second, third, fourth and fifth acceleration variation intervals may be understood as respectively corresponding to the stationary phase, the hand down-swinging phase, the hand up-swinging phase, the hang time phase and the landing phase. Namely, if the user 301 has correctly performed the CMJ action according to the process shown in FIG. 3, the measured acceleration data will accordingly include the aforementioned first, second, third, fourth and fifth acceleration variation intervals in sequence.

In FIG. 4A, the shown acceleration data may be divided into acceleration variation intervals 411-415. As it is shown in FIG. 4A, the average value and standard deviation of the acceleration data in the acceleration variation interval 411 are respectively smaller than the corresponding average threshold (for example, 0.5 g, where g is the acceleration of gravity) and the standard deviation threshold (for example, 0.1 g); the acceleration data in the acceleration variation interval 412 includes at least acceleration data lower than the first acceleration threshold (for example, −25 m/s$^2$). The acceleration data in the acceleration variation interval 413 includes at least acceleration data lower than the second acceleration threshold (for example, −125 m/s²). The acceleration data in the acceleration variation interval 415 includes at least acceleration data higher than the third acceleration threshold (for example, 25 m/s²). Therefore, the acceleration variation intervals 411-415 may respectively correspond to the first, second, third, fourth and fifth acceleration variation intervals. In this case, the acceleration data in FIG. 4A may be determined to include a specific acceleration variation interval.

In another embodiment, regarding the acceleration variation intervals, it is only needed to consider the aforementioned first acceleration variation interval corresponding to the stationary phase, and consider the following specific velocity variation interval and specific displacement variation interval to determine that the motion data conforms to the following the action characteristics of the CMJ action.

In the embodiment of the disclosure, the considered specific velocity variation interval may include, for example, a first velocity variation interval, a second velocity variation interval, a third velocity variation interval, a fourth velocity variation interval, a fifth velocity variation interval, and a sixth velocity variation interval. In an embodiment, the velocity data in the first velocity variation interval includes at least first velocity data lower than a first velocity threshold (for example, −0.4 m/s). The second velocity variation interval includes at least second velocity data higher than a second velocity threshold (for example, 0.5 m/s). The third velocity variation interval includes at least third velocity data lower than a third velocity threshold (for example, −1 m/s). The fourth velocity variation interval includes at least fourth velocity data higher than a fourth velocity threshold (for example, 1.5 m/s). The fifth velocity variation interval includes at least fifth velocity data lower than a fifth velocity threshold (for example, 0.25 m/s). The sixth velocity variation interval includes at least sixth velocity data higher than a sixth velocity threshold (for example, 0.25 m/s).

In the embodiment of the disclosure, if the user 301 has correctly performed the CMJ action according to the process shown in FIG. 3, the measured velocity data will correspondingly include the aforementioned first, second, third, fourth, fifth and sixth velocity variation intervals in sequence.

In FIG. 4B, the shown velocity data may be divided into velocity variation intervals 421-426. It may be seen from FIG. 4B that the velocity variation interval 421 (which corresponds to, for example, a valley) at least includes velocity data 421a lower than the first velocity threshold (for example, −0.4 m/s). The velocity variation interval 422 (for example, a peak following the velocity variation interval 421) includes at least velocity data 422a higher than a second velocity threshold (for example, 0.5 m/s). The velocity variation interval 423 (for example, a valley following the velocity variation interval 422) includes at least velocity data 423a lower than the third velocity threshold (for example, −1 m/s). The velocity variation interval 424 (for example, a peak following the velocity variation interval 423) includes at least velocity data 424a higher than the fourth velocity threshold (for example, 1.5 m/s). The velocity variation interval 425 (which is, for example, a valley that appears after the velocity variation interval 424) includes at least velocity data 425a lower than the fifth velocity threshold (for example, 0.25 m/s). The velocity variation interval 426 (for example, a peak following the velocity variation interval 425) includes at least velocity data 426a higher than the sixth velocity threshold (for example, 0.25 m/s). Therefore, the velocity variation intervals 421-426 may respectively correspond to the aforementioned first, second, third, fourth, fifth and sixth velocity variation intervals. In this case, the velocity data in FIG. 4B may be determined to include a specific velocity variation interval.

In the embodiment of the disclosure, the considered specific displacement variation interval may sequentially include, for example, a first displacement variation interval, a second displacement variation interval, a third displacement variation interval, a fourth displacement variation interval, a fifth displacement variation interval, and a sixth displacement variation interval. In an embodiment, the displacement data in the first displacement variation interval includes at least first displacement data lower than a first displacement threshold (for example, −0.1 m). The displacement data in the second displacement variation interval includes at least second displacement data higher than the first displacement data. The displacement data in the third displacement variation interval includes at least third displacement data lower than the first displacement data. The fourth displacement variation interval includes at least fourth displacement data higher than the first displacement data. The fifth displacement variation interval includes at least fifth displacement data higher than the fourth displacement data. The sixth displacement variation interval includes at least sixth displacement data lower than the fifth displacement data.

In the embodiment of the disclosure, if the user 301 has correctly performed the CMJ action according to the process shown in FIG. 3, the measured displacement data will correspondingly include the first, second, the third, fourth, fifth and sixth displacement variation intervals in sequence.

In FIG. 4C, the shown displacement data may be divided into displacement variation intervals 431-436. It may be seen from FIG. 4C, the displacement data in the displacement variation interval 431 (which corresponds to, for example, a valley) includes at least displacement data 431a lower than the first displacement threshold (for example, −0.1 m). The displacement data in the displacement variation interval 432 (which, for example, corresponds to a peak following the displacement variation interval 431) includes at least displacement data 432a higher than the displacement data 431a. The displacement data in the displacement variation interval 433 (which, for example, corresponds to a valley following the displacement variation interval 432) includes at least displacement data 433a lower than the displacement data 431a. The displacement variation interval 434 (which, for example, corresponds to a peak following the displacement variation interval 433) includes at least displacement data 434a higher than the displacement data 431a. The displacement variation interval 435 (which, for example, corresponds to a peak appeared after the displacement variation interval 434) includes at least displacement data 435a higher than the displacement data 434a. The displacement variation interval 436 (which, for example, corresponds to a valley following the displacement variation interval 435) includes at least displacement data 436a lower than the displacement data 435a. Therefore, the displacement variation intervals 421-426 may respectively correspond to the first, second, third, fourth, fifth and sixth displacement variation intervals, respectively. In this case, the displacement data in FIG. 4C may be determined to include a specific displacement variation interval.

In one embodiment, in response to determining that the acceleration data includes the aforementioned specific acceleration variation interval, the velocity data includes the aforementioned specific velocity variation interval, and the displacement data includes the aforementioned specific displacement variation interval, the processor 104 may accordingly determine that the aforementioned motion data conforms to the action characteristics of the CMJ action, otherwise, it may be determined that the above motion data does not conform to the action characteristics of the CMJ action, but the disclosure is not limited thereto.

In response to determining that the motion data conforms to the action characteristics of a specific action (for example, the CMJ action), the processor 104 predicts at least one sports performance of the user 301 performing at least one other action based on the motion data.

In the first embodiment, other considered actions include, for example, a standing long jump (SLJ) action, but the disclosure is not limited thereto. In this case, the processor 104 may, for example, determine a jump height that the user 301 performs the CMJ action based on the motion data.

For example, after obtaining the displacement data of FIG. 4C, the processor 104 may, for example, learn the jump height (represented by H1) that the user 301 performs the CMJ action based on the difference between the displacement data 435a (which corresponds to, for example, the highest point of the hang time phase) and the displacement data 436a (which corresponds to, for example, the landing phase), but the disclosure is not limited thereto.

Then, the processor 104 may obtain a first correlation between the CMJ action and the SLJ action, and predict a jump distance (represented by D1) that the user 301 performs the SLJ action based on the jump height H1 and the above first correlation.

In a first embodiment, the first correlation between CMJ action and the SLJ action may be represented as a regression relationship between the sports performances of the two actions.

Figure 5A:
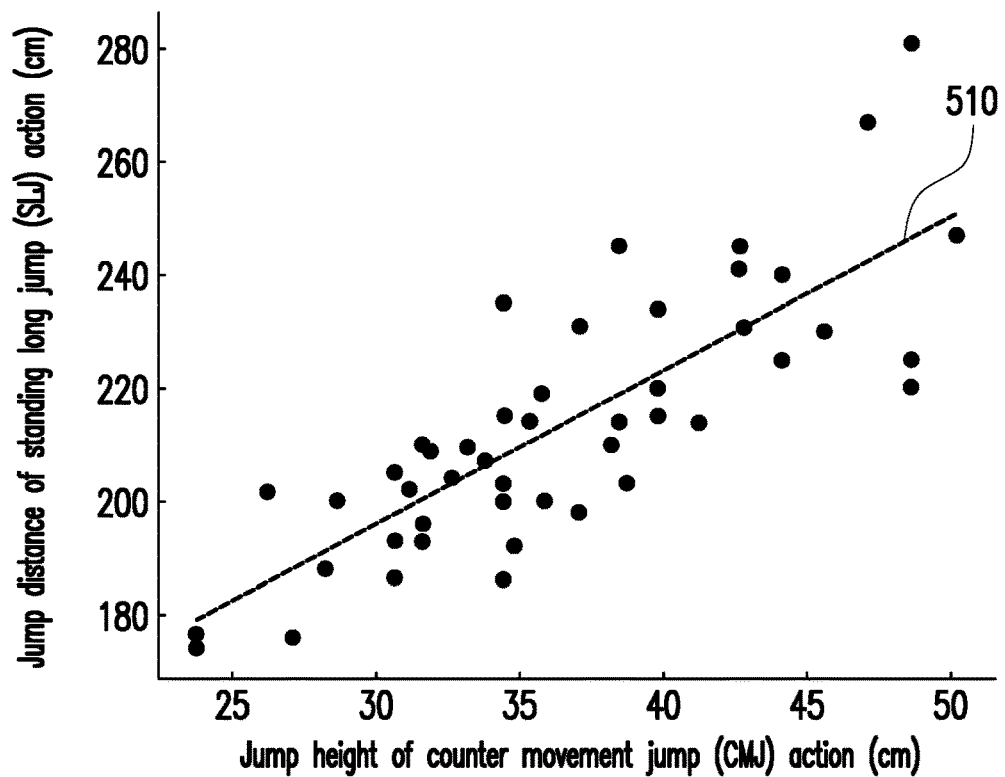
FIG. 5A is a schematic diagram of a regression relationship between sports performances of the CMJ action and a SLJ action according to a first embodiment of the disclosure.

Referring to FIG. 5A, FIG. 5A is a schematic diagram of the regression relationship between the sports performances of the CMJ action and the SLJ action according to a first embodiment of the disclosure.

In FIG. 5A, each data point may be, for example, a sports performance corresponding to a different user belonging to a same group as the user 301 (for example, belong to a certain age range, gender, etc.) or a different user not belonging to group who performs the CMJ action and the SLJ action. In the first embodiment, the processor 104 may perform regression analysis on the data points in FIG. 5A to obtain a regression relationship between the sports performances of the CMJ action and the SLJ action to serve as the first correlation.

In the first embodiment, the aforementioned first correlation may be characterized as a first linear regression model 510, which may have a form of "a*H1+b=D1", where a and b are regression coefficients, but the disclosure is not limited thereto. For example, in the situation of FIG. 5A, a is about 3.3858 and b is about 87.3836.

Based on above description, after the processor 104 measures the jump height H1, the jump height H1 may be substituted into the first linear regression model 510 to predict the jump distance D1.

In a second embodiment, in addition to the SLJ action, other considered actions may also include a dash action corresponding to a specific distance (for example, 50 m) (which is referred to as a 50-meter dash hereinafter), but the disclosure is not limited thereto. In this case, the processor 104 may, for example, obtain a second correlation between the CMJ action, the SLJ action, and the 50-meter dash. Thereafter, the processor 104 predicts a running time (which is referred to as T1) for the user 301 to complete a specific distance through the dash action based on the jump height H1, the jump distance D1 and the aforementioned second correlation.

In the second embodiment, the processor 104 may first obtain a correlation between the CMJ action and the 50-meter dash (which may be represented as a regression relationship between the sports performances of the CMJ action and the 50-meter dash) and a correlation between the SLJ action and the 50-meter dash (which may be represented as a regression relationship between the sports performances of the SLJ action and the 50-meter dash), and accordingly obtain the aforementioned second correlation.

Figure 5B:
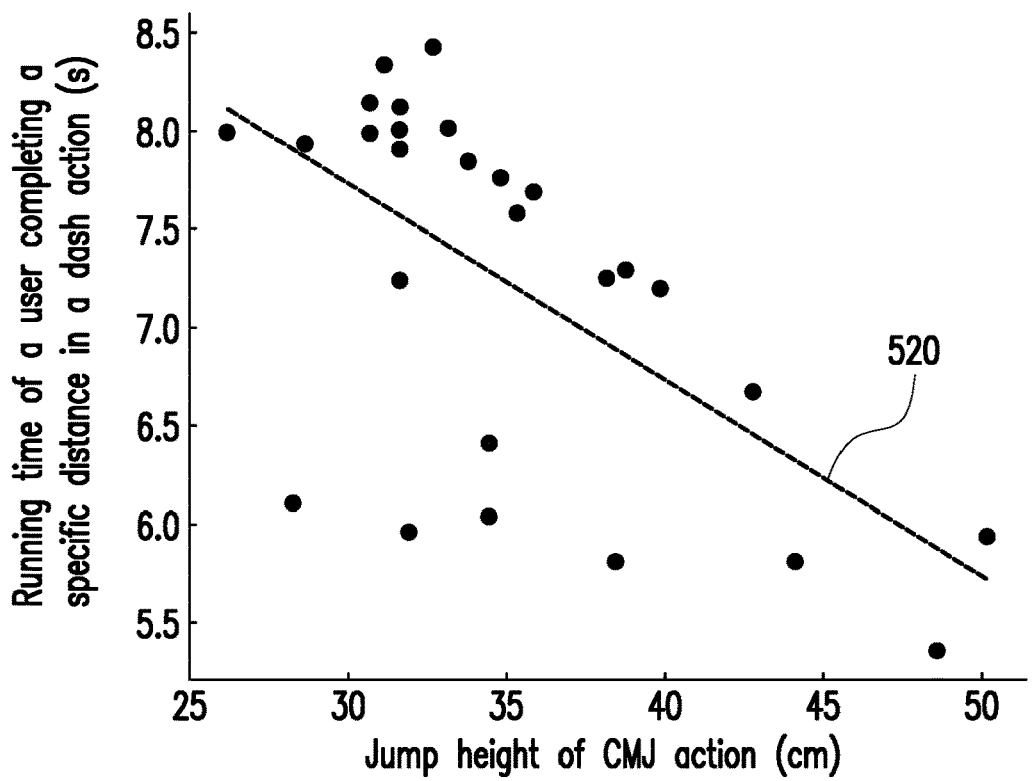
FIG. 5B is a schematic diagram of a regression relationship between sports performances of the CMJ action and the 50-meter dash according to FIG. 5A.
Figure 5C:
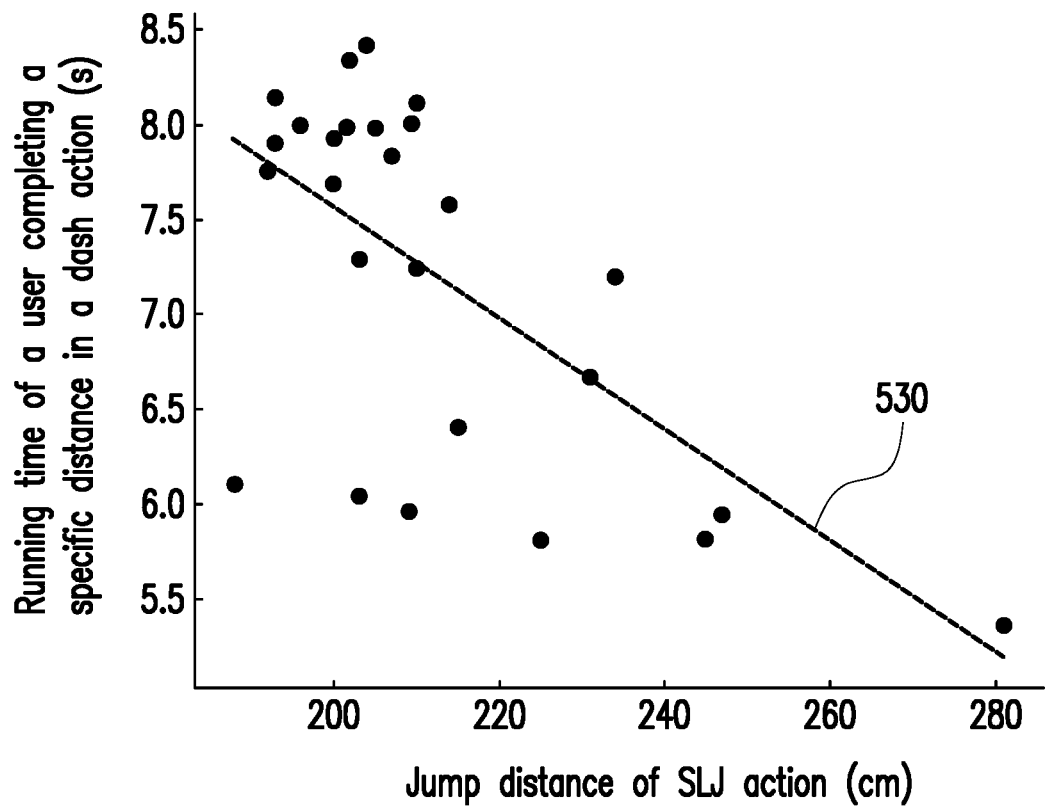
FIG. 5C is a schematic diagram of a regression relationship between sports performances of the SLJ action and the 50-meter dash according to FIG. 5A and FIG. 5B.

Referring to FIG. 5B and FIG. 5C, FIG. 5B is a schematic diagram of a regression relationship between the sports performances of the CMJ action and the 50-meter dash according to FIG. 5A, and FIG. 5C is a schematic diagram of a regression relationship between the sports performances of the SLJ action and the 50-meter dash according to FIG. 5A and FIG. 5B.

In FIG. 5B, each data point may be, for example, a sports performance corresponding to a different user belonging to a same group as the user 301 or a different user not belonging to group who performs the CMJ action and the 50-meter dash. In FIG. 5C, each data point may be, for example, a sports performance corresponding to a different user belonging to a same group as the user 301 or a different user not belonging to group who performs the SLJ action and the 50-meter dash.

In the second embodiment, the processor 104 may perform regression analysis on the data points in FIG. 5B to obtain a regression relationship between the sports performances of the CMJ action and the 50-meter dash, which may be represented by, for example, a second linear regression model 520. In addition, the processor 104 may perform regression analysis on the data points in FIG. 5C to obtain a regression relationship between the sports performances of the SLJ action and the 50-meter dash, which may be characterized as a third linear regression model 530.

In the second embodiment, the processor 104 may, for example, perform multiple regression analysis based on the first, second, and third linear regression models 510, 520, and 530 to obtain the second correlation between the CMJ action, the SLJ action, and the 50-meter dash.

In the second embodiment, the aforementioned second correlation may be characterized as a fourth linear regression model, which may have a form of "c*H1+d*D1+e=T1", where c, d, e are regression coefficients, but the disclosure is not limited thereto. In the situation of FIG. 5A and FIG. 5B, c is about −0.03586, d is about −0.0199, and e is about 12.9281.

In the third embodiment, the processor 104 may obtain the correlation between the CMJ action and the 50-meter dash (which may be represented as a regression relationship between the sports performances of the CMJ action and the 50-meter dash) to obtain a third correlation between the CMJ action and the 50-meter dash, which may be characterized as the aforementioned second linear regression model 520.

Based on the above description, after the processor 104 measures the jump height H1 and predicts the jump distance D1, the jump distance D1 may be substituted into the aforementioned fourth linear regression model to predict the running time T1. In another embodiment, the jump distance D1 may also be substituted into the second linear regression model to predict the running time T1.

In an embodiment of the disclosure, the aforementioned linear regression model for the correlation between the CMJ action, the SLJ action, and the 50-meter dash may be generated separately from the sports performance data of different groups of users. In another embodiment, the aforementioned linear regression model may also be generated from the sports performance data of users not belong to groups.

In an embodiment of the disclosure, the user may select a group suitable for himself through a user interface, and the processor 104 may select the corresponding linear regression model according to the user's selection. In another embodiment, the processor 104 may automatically select the linear regression model suitable for the user according to personal information input by the user in advance, for example, including but not limited to age, gender and other information.

Through experiments, the statistical errors of the jump distance D1 and the running time T1 predicted by the disclosure are all lower than 10%.

The disclosure further provides a computer readable storage medium for executing the method for predicting sports performance. The computer readable storage medium is composed of a plurality of program instructions (for example, a setup program instruction and a deployment program instruction) implemented therein. These program instructions may be loaded into the sports performance predicting device 100 and executed by the sports performance predicting device 100, so as to execute the aforementioned method for predicting sports performance and functions of the sports performance predicting device 100.

In summary, in the embodiments of the disclosure, it is determined whether the motion data of the user conforms to the action characteristics of the specific action under consideration (for example, the CMJ action). If yes, the embodiments of the disclosure may further predict the sports performance of the user performing other actions (for example, the SLJ action and/or the 50-meter dash) based on the above-mentioned motion data. In this way, even if the user is unable to perform certain actions for some reason, the embodiments of the disclosure may still predict the sports performances of the user in these actions that are unable to be performed based on the motion data of the user in other actions, thereby improving the convenience and flexibility of sports detection.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A method for predicting sports performance, adapted to a sports performance predicting device, wherein the sports performance predicting device is a wearable device comprising a non-transitory storage circuit, a processor, a motion detection device, and a user interface, wherein the non-transitory storage circuit stores a program code, and wherein the processor coupled to the non-transitory storage circuit and accesses the program code to perform the method comprising:

requesting, by the processor, a user to perform a specific action in sequentially action phases through the wearable device, wherein the wearable device is worn on a hand of the user and provided with the motion detection device, and wherein the specific action is a counter movement jump action;

collecting, by the processor, motion data of the wearable device in a process of the user performing the specific action through the motion detection device, wherein the motion data comprises acceleration data, velocity data, and displacement data in the process of the user performing the specific action;

determining, by the processor, whether the acceleration data comprises a specific acceleration variation interval, the velocity data comprises a specific velocity variation interval, and the displacement data comprises a specific displacement variation interval;

in response to determining, by the processor, that the acceleration data comprises the specific acceleration variation interval, the velocity data comprises the specific velocity variation interval, and the displacement data comprises the specific displacement variation interval, determining that the motion data conforms to action characteristics of the specific action; and in response to determining, by the processor, that the motion data conforms to the action characteristics of the specific action, predicting at least one sports performance of the user performing at least one other action based on the motion data, wherein the at least one other action comprises a standing long jump action, and wherein the sports performance of the standing long jump action not performed by the user is predicted according to the sports performance of the counter movement jump action performed by the user, and the step of predicting the at least one sports performance of the user performing the at least one other action based on the motion data comprises:

determining, by the processor, a jump height of the user performing the counter movement jump action based on the motion data and displaying the jump height through the user interface of the wearable device;

obtaining, by the processor, a first correlation between the counter movement jump action and the standing long jump action;

predicting, by the processor, a jump distance of the user performing the standing long jump action based on the jump height and the first correlation; and outputting and displaying, by the processor, the jump distance through the user interface of the wearable device.

2. The method for predicting sports performance as claimed in claim 1, wherein the specific acceleration variation interval comprises a first acceleration variation interval; and an average value and a standard deviation of the acceleration data in the first acceleration variation interval are respectively smaller than a corresponding average value threshold and a standard deviation threshold.

3. The method for predicting sports performance as claimed in claim 1, wherein the specific velocity variation intervals comprise a first velocity variation interval, a second velocity variation interval, a third velocity variation interval, a fourth velocity variation interval, a fifth velocity variation interval, and a sixth velocity variation interval;

the velocity data in the first velocity variation interval at least comprises first velocity data lower than a first velocity threshold, the velocity data in the second velocity variation interval at least comprises second velocity data higher than a second velocity threshold, the velocity data in the third velocity variation interval at least comprises third velocity data lower than a third velocity threshold, the fourth velocity variation interval at least comprises fourth velocity data higher than a fourth velocity threshold, the fifth velocity variation interval at least comprises fifth velocity data lower than a fifth velocity threshold, and the sixth velocity variation interval at least comprises sixth velocity data higher than a sixth velocity threshold.

4. The method for predicting sports performance as claimed in claim 1, wherein the specific displacement variation intervals comprise a first displacement variation interval, a second displacement variation interval, a third displacement variation interval, a fourth displacement variation interval, a fifth displacement variation interval, and a sixth displacement variation interval;

the displacement data in the first displacement variation interval at least comprises first displacement data lower than a first displacement threshold, the displacement data in the second displacement variation interval at least comprises second displacement data higher than the first displacement data, the displacement data in the third displacement variation interval at least comprises third displacement data lower than the first displacement data, the fourth displacement variation interval at least comprises fourth displacement data higher than the first displacement data, the fifth displacement variation interval at least comprises fifth displacement data higher than the fourth displacement data, and the sixth displacement variation interval at least comprises sixth displacement data lower than the fifth displacement data.

5. The method for predicting sports performance as claimed in claim 1, wherein the at least one other action further comprises a dash action corresponding to a specific distance, and the method further comprises:

obtaining a second correlation between the counter movement jump action, the standing long jump action, and the dash action; and predicting a running time of the user completing the specific distance in the dash action based on the jump height, the jump distance, and the second correlation and displaying the running time through the user interface of the wearable device.

6. A sports performance predicting device, wherein the sports performance predicting device is a wearable device, comprising:

a non-transitory storage circuit, storing a program code;
a motion detection device;
a user interface; and
a processor, coupled to the non-transitory storage circuit, and accessing the program code to execute:

requesting a user to perform a specific action in sequentially action phases through the wearable device, wherein the wearable device is worn on a hand of the user and provided with the motion detection device, and wherein the specific action is a counter movement jump action;

collecting motion data of the wearable device in a process of the user performing the specific action through the motion detection device, wherein the motion data comprises acceleration data, velocity data, and displacement data in the process of the user performing the specific action, and the processor further executes:

determining whether the acceleration data comprises a specific acceleration variation interval, the velocity data comprises a specific velocity variation interval, and the displacement data comprises a specific displacement variation interval;

in response to determining that the acceleration data comprises the specific acceleration variation interval, the velocity data comprises the specific velocity variation interval, and the displacement data comprises the specific displacement variation interval, determining that the motion data conforms to action characteristics of the specific action; and in response to determining that the motion data conforms to the action characteristics of the specific action, predicting at least one sports performance of the user performing at least one other action based on the motion data, wherein the at least one other action comprises a standing long jump action, and wherein the sports performance of the standing long jump action not performed by the user is predicted according to the sports performance of the counter movement jump action performed by the user, and the processor further executes:

determining a jump height of the user performing the counter movement jump action based on the motion data and displaying the jump height through the user interface of the wearable device;

obtaining a first correlation between the counter movement jump action and the standing long jump action;

predicting a jump distance of the user performing the standing long jump action based on the jump height and the first correlation; and outputting and displaying the jump distance through the user interface of the wearable device.

7. The sports performance predicting device as claimed in claim 6, wherein the specific acceleration variation interval comprises a first acceleration variation interval; and an average value and a standard deviation of the acceleration data in the first acceleration variation interval are respectively smaller than a corresponding average value threshold and a standard deviation threshold.

8. The sports performance predicting device as claimed in claim 6, wherein the specific velocity variation intervals comprise a first velocity variation interval, a second velocity variation interval, a third velocity variation interval, a fourth velocity variation interval, a fifth velocity variation interval, and a sixth velocity variation interval;

the velocity data in the first velocity variation interval at least comprises first velocity data lower than a first velocity threshold, the velocity data in the second velocity variation interval at least comprises second velocity data higher than a second velocity threshold, the velocity data in the third velocity variation interval at least comprises third velocity data lower than a third velocity threshold, the fourth velocity variation interval at least comprises fourth velocity data higher than a fourth velocity threshold, the fifth velocity variation interval at least comprises fifth velocity data lower than a fifth velocity threshold, and the sixth velocity variation interval at least comprises sixth velocity data higher than a sixth velocity threshold.

9. The sports performance predicting device as claimed in claim 6, wherein the specific displacement variation intervals comprise a first displacement variation interval, a second displacement variation interval, a third displacement variation interval, a fourth displacement variation interval, a fifth displacement variation interval, and a sixth displacement variation interval;

the displacement data in the first displacement variation interval at least comprises first displacement data lower than a first displacement threshold, the displacement data in the second displacement variation interval at least comprises second displacement data higher than the first displacement data, the displacement data in the third displacement variation interval at least comprises third displacement data lower than the first displacement data, the fourth displacement variation interval at least comprises fourth displacement data higher than the first displacement data, the fifth displacement variation interval at least comprises fifth displacement data higher than the fourth displacement data, and the sixth displacement variation interval at least comprises sixth displacement data lower than the fifth displacement data.

10. The sports performance predicting device as claimed in claim 6, wherein the at least one other action further comprises a dash action corresponding to a specific distance, and the processor further executes:

obtaining a second correlation between the counter movement jump action, the standing long jump action, and the dash action; and predicting a running time of the user completing the specific distance in the dash action based on the jump height, the jump distance, and the second correlation and displaying the running time through the user interface of the wearable device.

11. A non-transitory computer readable storage medium, the non-transitory computer readable storage medium recording an executable computer program, wherein the non-transitory computer readable storage medium is adapted to a sports performance predicting device, wherein the sports performance predicting device is a wearable device comprising the non-transitory computer readable storage medium, a processor, a motion detection device, and a user interface, and the executable computer program being loaded by the processor to the sports performance predicting device to execute:

requesting a user to perform a specific action in sequentially action phases through the wearable device, wherein the wearable device is worn on a hand of the user and provided with the motion detection device, and wherein the specific action is a counter movement jump action;

collecting motion data of the wearable device in a process of the user performing the specific action through the motion detection device, wherein the motion data comprises acceleration data, velocity data, and displacement data in the process of the user performing the specific action;

determining whether the acceleration data comprises a specific acceleration variation interval, the velocity data comprises a specific velocity variation interval, and the displacement data comprises a specific displacement variation interval;

in response to determining that the acceleration data comprises the specific acceleration variation interval, the velocity data comprises the specific velocity variation interval, and the displacement data comprises the specific displacement variation interval, determining that the motion data conforms to action characteristics of the specific action; and in response to determining that the motion data conforms to the action characteristics of the specific action, predicting at least one sports performance of the user performing at least one other action based on the motion data, wherein the at least one other action comprises a standing long jump action, and wherein the sports performance of the standing long jump action not performed by the user is predicted according to the sports performance of the counter movement jump action performed by the user, and the step of predicting the at least one sports performance of the user performing the at least one other action based on the motion data comprises:

determining a jump height of the user performing the counter movement jump action based on the motion data and displaying the jump height through the user interface of the wearable device;

obtaining a first correlation between the counter movement jump action and the standing long jump action;

predicting a jump distance of the user performing the standing long jump action based on the jump height and the first correlation; and outputting and displaying the jump distance through the user interface of the wearable device.

12. The non-transitory computer readable storage medium as claimed in claim 11, wherein the at least one other action further comprises a dash action corresponding to a specific distance, and further comprises:

obtaining a second correlation between the counter movement jump action, the standing long jump action, and the dash action; and predicting a running time of the user completing the specific distance in the dash action based on the jump height, the jump distance, and the second correlation and displaying the running time through the user interface of the wearable device.

* * * * *